(12) United States Patent
Dalsgaard et al.

(10) Patent No.: US 8,818,321 B2
(45) Date of Patent: Aug. 26, 2014

(54) METHOD AND SYSTEM FOR PROVIDING REPLY-CONTROLLED DISCONTINUOUS RECEPTION

(75) Inventors: Lars Dalsgaard, Oulu (FI); Jarkko Koskela, Oulu (FI); Sari Nielsen, Espoo (FI); Jukka Ranta, Kaarina (FI); Juho Pirskanen, Tampere (FI)

(73) Assignee: Nokia Corporation, Espoo (FI)

( * ) Notice: Subject to any disclaimer, the term of this patent is extended or adjusted under 35 U.S.C. 154(b) by 331 days.

(21) Appl. No.: 11/549,761

(22) Filed: Oct. 16, 2006

(65) Prior Publication Data
US 2007/0291729 A1    Dec. 20, 2007

(30) Foreign Application Priority Data
Jun. 20, 2006   (EP) ..................................... 06012656

(51) Int. Cl.
*H04B 1/16*       (2006.01)

(52) U.S. Cl.
USPC ..................... 455/343.2; 455/418; 455/422.1; 455/432.1; 455/515; 370/328; 370/338

(58) Field of Classification Search
USPC ............... 455/67.11, 320, 342, 343.2–3, 449, 455/418–420, 422.1–425, 574, 455/422.1–426.2, 432.1, 434, 466, 515; 370/347, 342, E1.009, 328–338
See application file for complete search history.

(56) References Cited

U.S. PATENT DOCUMENTS

| | | | |
|---|---|---|---|
| 6,829,493 B1 * | 12/2004 | Hunzinger | 455/574 |
| 2003/0119503 A1 * | 6/2003 | Shohara et al. | 455/434 |
| 2005/0032555 A1 * | 2/2005 | Jami et al. | 455/574 |
| 2005/0153751 A1 * | 7/2005 | Bultan et al. | 455/574 |
| 2005/0221835 A1 * | 10/2005 | Thorson et al. | 455/452.2 |

* cited by examiner

*Primary Examiner* — Quan M Hua
(74) *Attorney, Agent, or Firm* — Ditthavong & Steiner, P.C.

(57) ABSTRACT

A method, receiving device, network element, system and computer program product for controlling discontinuous reception at a receiving device of a communication network are disclosed. A regular discontinuous reception cycle of a discontinuous reception scheme is set, and this regular discontinuous reception cycle is switched to a shorter temporary discontinuous reception cycle or is switched off, in response to an event which triggers a reply of the communication network to the receiving device. Thereby, delays of network replies can be shortened or controlled in case discontinuous reception (DRX) cycles are implemented at the receiving device.

21 Claims, 6 Drawing Sheets

METHOD AND SYSTEM FOR PROVIDING REPLY-CONTROLLED DISCONTINUOUS RECEPTION

FIELD OF THE INVENTION

The invention, according to various embodiments, relates to communications, and particularly, to controlling reception in a communication network.

BACKGROUND OF THE INVENTION

Discontinous reception (DRX) is a method used in communication networks to conserve battery energy of receiving devices, e.g., mobile devices or user equipment (UE). The UE and the network negotiate phases in which data transfer happens. During other times the device turns its receiver off and enters into a low-power state.

One major aspect affecting the UE stand-by time is the possibility to inactivate the UE receiver circuitry. In the Universal Mobile Telecommunications System (UMTS) Radio Access Network (UTRAN), this is mainly utilized in paging states, where the UE is listening periodically to the paging channel. DRX period(s) and triggers/timers which result in DRX are typically configured by Radio Resource Control (RRC) functionality. Alternatively, the network may direct inactive UEs to DRX by explicit commands. Configuring long DRX periods allows for long standby times with the expense of elevated wake-up times for network-initiated data transfers.

Consequently, DRX has direct impact on how often the network is able to address the UE. The need for the network to be able reach/address a UE depends on the connection type(s) between the UE and network. In case of a streaming connection, the DRX cycle will most probably be different than in case of a mail download. This is linked to the quality of service (QoS) of the connection.

As UE power consumption greatly depends on how often UE has to turn on its transceiver, it is clear from the above description that the DRX interval has impact on UE power consumption. This means that one key to power saving is to make it possible to optimize the use of DRX in such a way that the network always can utilize the longest possible DRX taking the connection restrictions into account.

It is assumed that all resources are assigned more or less temporarily by the network to the UE by use of allocation tables (AT) or more general by use of a downlink (DL) resource assignment channel. These assignments or allocations may be grouped into one-time allocations and persistent allocations. One time resource assignment means that through the AT the UE will receive uplink (UL) and/or DL resource allocations which are valid only once and for that particular allocation in time. Alternatively, UL/DL resources may be assigned temporarily for a longer time period—so-called persistent allocations. This longer resource assignment may be done for longer pre-determined time or until new DRX and/or Discontinuous Transmission (DTX) information is signaled to the UE.

Figure 2:
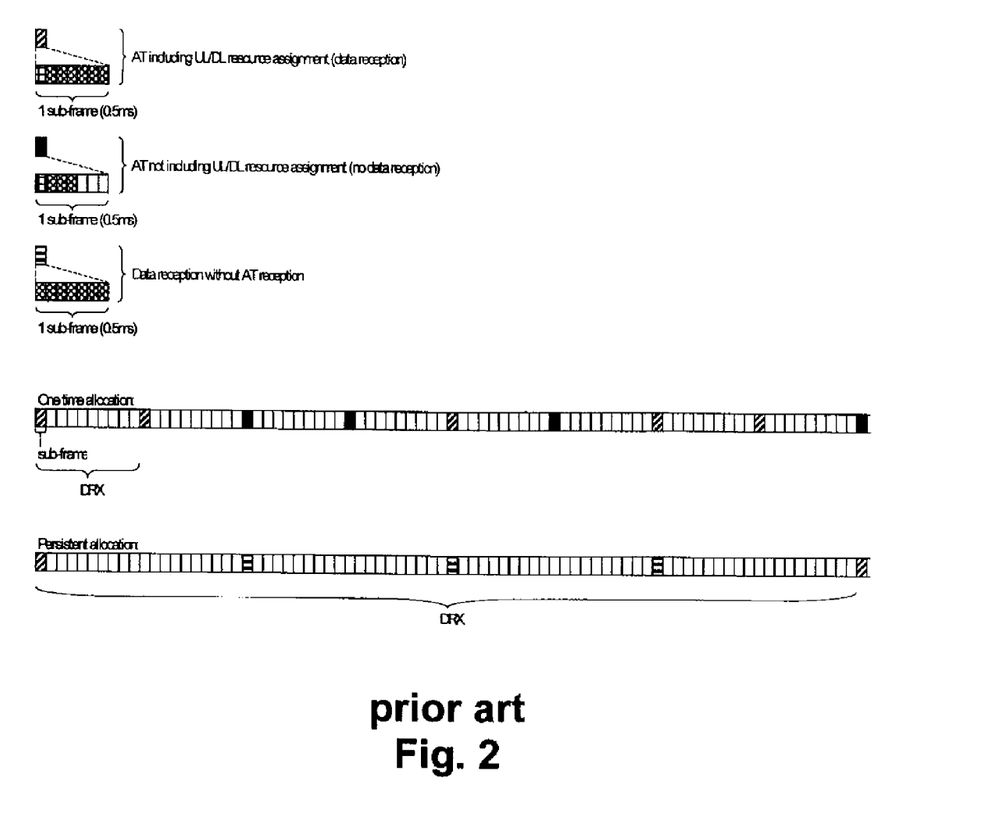
FIG. 2 shows a schematic timing examples of a one-time and a persistent resource allocation.

FIG. 2 shows time diagrams with examples of allocation schemes for one-time allocation and persistent allocation. As indicated in the upper part of FIG. 2, different filling patterns of the initial sub-frame of each DRX cycle represent different bit patterns of this initial sub-frame which may have a length of e.g., 0.5 ms. The different bit patterns are used to indicate whether an AT including UL/DL resource assignment (i.e., data reception) is provided, whether an AT not including any UL/DL resource assignment (i.e., no data reception) is provided, or whether reception without any AT is intended.

In the lower part of FIG. 2, two allocation examples are shown. The upper one relates to a one-time allocation and the lower one relates to a persistent allocation. As indicated by the filling pattern of the sub-frames of the one-time allocation example, the resource allocation is only valid for one DRX cycle and each sub-frame indicates that an AT with or without UL/DL resource assignment is included, i.e., data reception or no data reception is signaled, as desired. In contrast thereto, in the persistent allocation example, only the first sub-frame at the left end of the allocation pattern indicates an AT with UL/DL assignment, while the following sub-frames only indicate data reception without AT reception due to the fact that the allocation is valid for a longer DRX cycle covering several sub-frames.

At the receiving device, e.g., mobile terminal or UE, two operating modes may be provided: idle mode and active mode (also called RRC connected mode). In idle mode, mobility is based on UE-initiated or autonomous cell reselection, while in the active mode, mobility is based on UE-assisted network-commanded handover (HO). UE assistance is in this sense is achieved through delivery of measurements reports.

In this regard, a problem arises as there are so far no thoughts about how to handle the combination of having a packet switched connection with some varying (possibly long) DRX period, and thereby varying response time in DL from network to UE in situations where UE sends a measurement report.

An event triggered measurement reporting from the UE to the network may be used in order to supply the network with information required in the HO algorithm and HO decision process. Periodical reporting may also be considered at least for selected cases. The UE can send measurement reports at any time using normal access procedures, whereas the network can only reach the UE through the AT. As explained above, the UE will only receive ATs at certain points in time—determined by the DRX period. This means that there will be a delay in DL for the network before it is able to reach the UE with a possible HO command, wherein the delay depends on the current DRX period. The delay in the HO procedure caused by the delay in transferring the HO command to the UE may have unwanted side-effects and impact on network planning.

SUMMARY OF SOME EXEMPLARY EMBODIMENTS

Therefore, there is a need to provide a method and system for controlling discontinous reception (DRX), by means of which the downlink delay associated with the DRX period can be reduced.

According to an embodiment of the invention, a method of controlling discontinuous reception at a receiving device of a communication network is disclosed; said method comprising:

setting a regular discontinuous reception cycle of a discontinuous reception scheme; and     switching from said regular discontinuous reception cycle to a shorter temporary discontinuous reception cycle or switching off said discontinuous reception scheme, in response to an event which triggers a reply of said communication network to said receiving device.

According to another embodiment of the invention, a receiving device for controlling discontinuous reception of data from a communication network is disclosed; said receiving device comprising:

timer means for timing a regular discontinuous reception cycle of a discontinuous reception scheme; and switching means for switching said timer means from said regular discontinuous reception cycle to a shorter temporary discontinuous reception cycle or for switching off said timer means, in response to an event which triggers a reply of said communication network to said receiving device.

According to yet another embodiment of the invention, a network element for controlling discontinuous reception at a receiving device of a communication network is disclosed; said network element comprising signaling means for signaling to said receiving device a control information used for setting a temporary shortened discontinuous reception cycle, wherein said control information is determined based on a measurement report received from said receiving device.

Accordingly, reply delays can be shortened or controlled in case DRX cycles are implemented, e.g., in the active mode of the receiving device. Long DRX cycles (e.g., in the order of few seconds) can thus be maintained, which are attractive for example in the active mode in order to avoid transitions between idle mode and active mode for power saving purposes. With such long DRX cycles it is possible to achieve good power saving even if the receiving device is continuously in active mode.

Additionally, a simple solution to the above problem can be provided, according to certain embodiments of the invention, by having the receiving device enter a pre-determined and rather short DRX cycle for a certain time interval after the reply-triggering event. This could also mean that the receiving device stops using DRX for a certain time.

As an example for the specific case that the receiving device is a mobile terminal, the switching step may be performed when the mobile terminal has sent a mobility measurement report to said communication network. The shortened DRX cycle can be applied by the receiving device (e.g., UE) after the measurement report (as a specific but non-limiting example of the triggering event) can be utilized by the network to empty buffers from a source base station or node B.

Switching back to the regular DRX cycle can be initiated when no reply has been received from the communication network within a predetermined time period after the switching operation. On the other hand, switching back to the regular discontinuous reception cycle can be initiated in response to the receipt of a reply from the communication network.

Furthermore, the temporary or switched-off discontinuous reception state can be maintained until a new discontinuous reception configuration is signaled by the communication network.

The switching step may be performed in response to a predetermined type of report transmitted by the receiving device to the communication network. As an example, this predetermined type of report to may be indicated to the receiving device by a system or control information.

According to a particular implementation example, the switching operation may comprise or involve setting an interval of a cycle timer to a first predetermined value and setting a lifetime of the cycle timer to a second predetermined value. Optionally, the first and second values may be controlled and/or signaled by the network. The controlling of the first and second values may be performed based on a measurement report sent from the receiving device to the network.

Further advantageous modifications are described in the dependent claims.

BRIEF DESCRIPTION OF THE DRAWINGS

The invention will now be described in greater detail based on a preferred embodiment with reference to the accompanying drawings, in which.

DESCRIPTION OF THE PREFERRED EMBODIMENT

In the following, certain embodiments of the invention will be described in connection with a discontinous reception (DRX)-based handover procedure for a wireless connection between a mobile terminal and a base station device of a radio access network, such as evolved UTRAN (E-UTRAN) for example.

Figure 1:
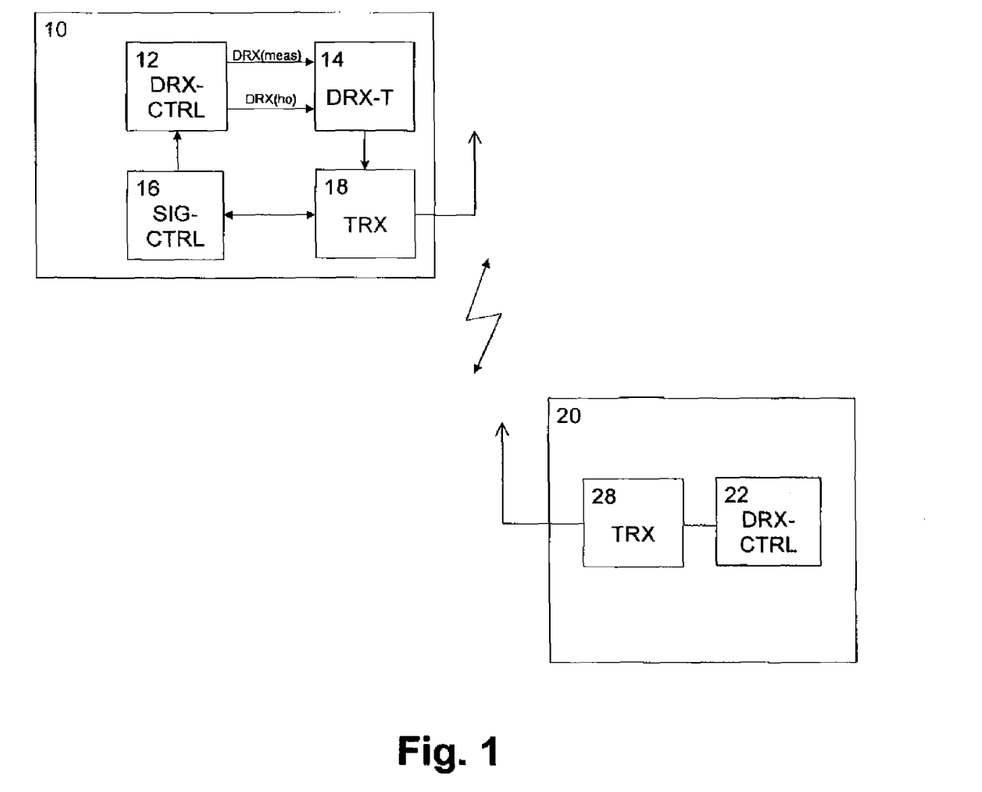
FIG. 1 shows schematic block diagrams of a receiving device and a network element according to one embodiment of the invention.

FIG. 1 shows schematic block diagrams of the mobile terminal or UE 10 and the base station device or node B 20 of the radio access network (in the following referred to more generally as "network"). Both the UE 10 and the node B 20 comprise respective transceiver (TRX) circuits 18, 28 for enabling transmission and reception of wireless signals. It is noted that the block diagrams of FIG. 1 only comprise those components required for understanding the DRX scheme according to one embodiment of the invention. Other components have been omitted for reasons of simplicity.

According to an exemplary embodiment, the UE 10 is configured to apply a predetermined shortened DRX interval or cycle or even stop using DRX (e.g., zero DTX interval) after having sent one of a number of specified triggering signalling messages to the network, e.g., to the node B 20. The shortened DRX interval or stopping of the DRX scheme could then be valid until the UE 10 either receives an expected response to the triggering message from the network or until a pre-determined time period runs out. The time period in which to apply the shortened or zero DRX interval could be determined in several different ways, as will be described later.

Initially or as a default procedure, regular DRX is determined and assigned to the UE 10 by the network and based on the current connection requirements. To this end, the node B 20 comprises a DRX control function or unit 22 which serves to provide control signalling by using a suitable control layer for setting and controlling the DRX scheme applied at the UE 10. Typically, but not necessarily, the DRX control unit 22 may use the RRC (Radio Resource Control) protocol layer for setting or changing the Regular DRX scheme. Thus, the DRX control unit 22 may be part of or controlled by the RRC entity of the network.

At the UE 10, DRX is achieved by controlling the TRX circuit 18 by a DRX control unit 12 which selectively controls a DRX timer circuit 14 to count a predetermined DRX cycle. The timer setting may be controlled by a respective control signalling received from the node B 20 and provided by the DRX control unit 22 thereof. Additionally, the UE 10 comprises a signaling control unit 16 configured to generate and process signalling messages exchanged with the network via the TRX circuit 18.

According to an exemplary embodiment, the DRX cycle (which may as well be designated as "DRX period" or "DRX interval") of the DRX timer circuit 14 of the UE 10 can be shortened or even stopped when a predetermined event which may trigger a network reply occurs. The following implementation example relates to a specific but non-limiting handover procedure which should be executed in a manner to control and/or minimize handover delays.

When the signalling control unit 16 at the UE 10 has initiated transmission of a certain or even any mobility measurement report to the network, e.g., node B 20, the signaling control unit 16 triggers the DRX control unit 12 of the UE 10 to apply a shortened DRX cycle or stop using the DRX cycle. This can be achieved by applying a first control value "DRX (meas)" which indicates the length of the shortened DRX cycle, and a second control value "DRX(ho)" which indicates the lifetime of the shortened DRX cycle to the DRX timer circuit 14. Hence, the particular shortened DRX cycle (as set by the first control value "DRX(meas)") will be applied by the UE 10 only for a certain specified time interval or lifetime (as set by the second control value "DRX(ho)), or until the network has indicated that the UE 10 may resume the usage of its previous DRX cycle (prior to the triggering) or until the network has indicated a new DRX cycle, or until an expected reply has been received from network. The behavior of the UE 10 may be different depending on whether a certain measurement report really triggers a handover in the network (i.e., HO command is received) or whether the UE 10 continues operating in the same cell (i.e., no HO command is received). There are different options for controlling the DRX cycle at the UE 10 after the DRX cycle has been shortened in response to a predefined trigger, e.g., after sending a measurement report to the network.

A specific trigger for the UE 10 to start using a shorter DRX cycle or stop using DRX could be certain predefined measurement reports, e.g., certain event-triggering reporting criteria defined by the specification or certain measurement reporting criteria (event-triggered or periodical reporting), which an operator could indicate to a UE 10 either in system information or through dedicated control signalling which may be generated at the DRX control unit 22 of the node B 20.

After the criteria for shortening the DRX cycle or stopping the usage of DRX are met, the DRX control unit 12 of the UE 10 would autonomously adjust the DRX cycle of the DRX timer circuit 14 accordingly, by applying corresponding control values "DRX(meas)" and "DRX(ho)". The stopping of the DRX usage may be achieved by setting the first control value "DRX(meas)" to zero.

In general, parameters controlling the intended behavior of the DRX timer circuit 14 at the UE 10 could be reporting criteria or parameters controlling reporting criteria that trigger an autonomous change of DRX cycle (i.e., short DRX cycle or no DRX), the DRX cycle after the change, e.g., control value "DRX(meas)", wherein the first control value "DRX(meas)" defines the DRX cycle (i.e., the period between UE reception of two successive AT's) to be used temporarily by the UE 10, and the time during which new shorter DRX cycle is used if no handover command is received, e.g., the second control value "DRX(ho)". The second control value "DRX(ho)" defines how long the UE 10 shall apply the shortened DRX cycle after having sent the measurement report to the network.

Implementation of the DRX timer circuit 14 can by achieved by two individual timers, one for counting the DRX cycle time ("DRX(meas)") and one for counting the DRX lifetime ("DRX(ho)"), wherein the control values of each timer could be fixed by specification or they could be a network determined and adjustable by the network (e.g., through system information or measurement information/commands).

There are several alternative ways how the proposed temporary decrease of the DRX cycle time can be implemented. The main difference between alternative implementations is the intelligence, and thereby complexity, used.

In the simplest implementation, the UE 10 may enter a non-DRX state for a specific amount of time. This basically means setting the first control value "DRX(meas)" to "0" and setting the second control value "DRX(ho)" to a fixed value, e.g., 100 ms. The setting of the non-DRX state may be stopped earlier due to handover command or other explicit DRX cycle signalling received from the network side.

In a more sophisticated implementation, network parameters such as signalling delay and placement of possible target cells (e.g., Intra-BS, Inter-BS or Inter-RAT) can be taken into account. In this case, the parameter setting could depend on the measurement report sent by the UE 10. This means that the response time of the network would depend on the whether a possible HO target is intra-BS or Inter-RAT. Thereby, the setting of the DRX timer circuit 14 could be optimized.

It is noted that the setting of the DRX timer circuit 14 is not restricted to time values, such as seconds or the like. Rather, any possible time period indication may be used, such as system specific timings (sub-frames, frames etc.) or e.g., counter-based timings (e.g., x amount of repetitions or instances of a certain message).

It is clear that the DRX timer circuit 14 and the DRX control unit 12 of the UE 10, as well as the DRX control unit 22 of the node B 20 may be implemented as programs or subroutines controlling a processor device or computer device to implement the required functionalities. Alternatively, implementation of the above functionalities may be achieved by discrete hardware circuits or units.

In the following, the functionality of the reply-controlled shortened DRX cycle is described with reference to FIG. 3 through an example as seen from UE's point of view.

Figure 3:
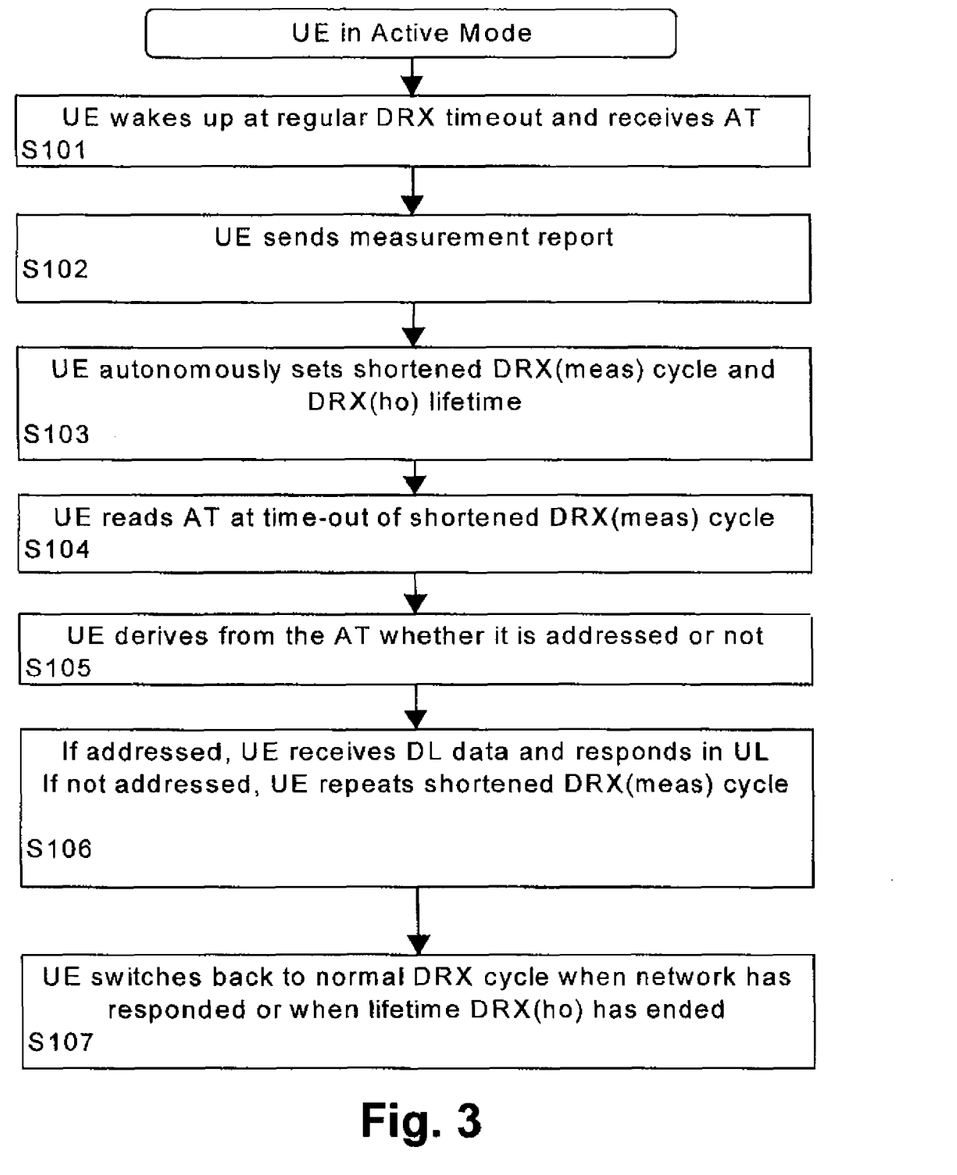
FIG. 3 shows a schematic flow diagram of a discontinuous reception (DRX) control procedure according to one embodiment of the invention.

FIG. 3 shows a schematic flow diagram of an interaction procedure between the regular DRX scheme and the shortened DRX scheme according to an exemplary embodiment. It is assumed that the UE 10 is in the active mode and has been assigned a Regular DRX cycle, e.g., by control signalling received from the Regular DRX control unit 22 of the node B 20 and determined based on the current connection requirements. In the active mode, the UE 10 is able to perform UL/DL transport with very limited access.

At Regular DRX timeout signaled by the DRX timer circuit 14, the UE 10 wakes up and receives an AT (step S101). It is assumed that the UE 10 performs the measurements in connection with AT reception for power saving reasons. After processing of the measurements, sending of a measurement report might be triggered. Accordingly, the signaling control unit 16 of the UE 10 initiates transmission of a measurement report to which a network reply can be expected and which thus can be regarded as a triggering event for the shortened DRX cycle (step S102). Consequently, the signaling control unit 16 triggers the DRX control unit 12 to autonomously set the shortened DRX cycle "DRX(meas)" and the associated lifetime "DRX(ho)" at the DRX timer circuit 14 (step S103).

At the next timeout of the shortened DRX cycle in step S104, the UE 10 reads the new AT (step S104). Then, in step S105, the UE 10 derives from the new AT whether it is addressed or not. If it is addresses, the UE 10 receives in step S106 DL data and responds in UL. On the other hand, if it is not addresses, the UE 10 repeats the shortened DRX cycle in step S106. Finally, in step S107, the DRX control unit 12 of the UE 10 switches back to the initial normal DRX cycle when the network has responded or when the lifetime "DRX (ho)" has expired.

The shortened DRX cycle ("DRX(meas)") could be defined based on a modulus (MOD) of the regular DRX interval/cycle or based on a specific number, and the life-time of the Interim DRX scheme. The lifetime ("DRX(ho)") could be defined in terms of time or frames etc. or in terms of repetitions of interval/cycles.

Figure 4A:
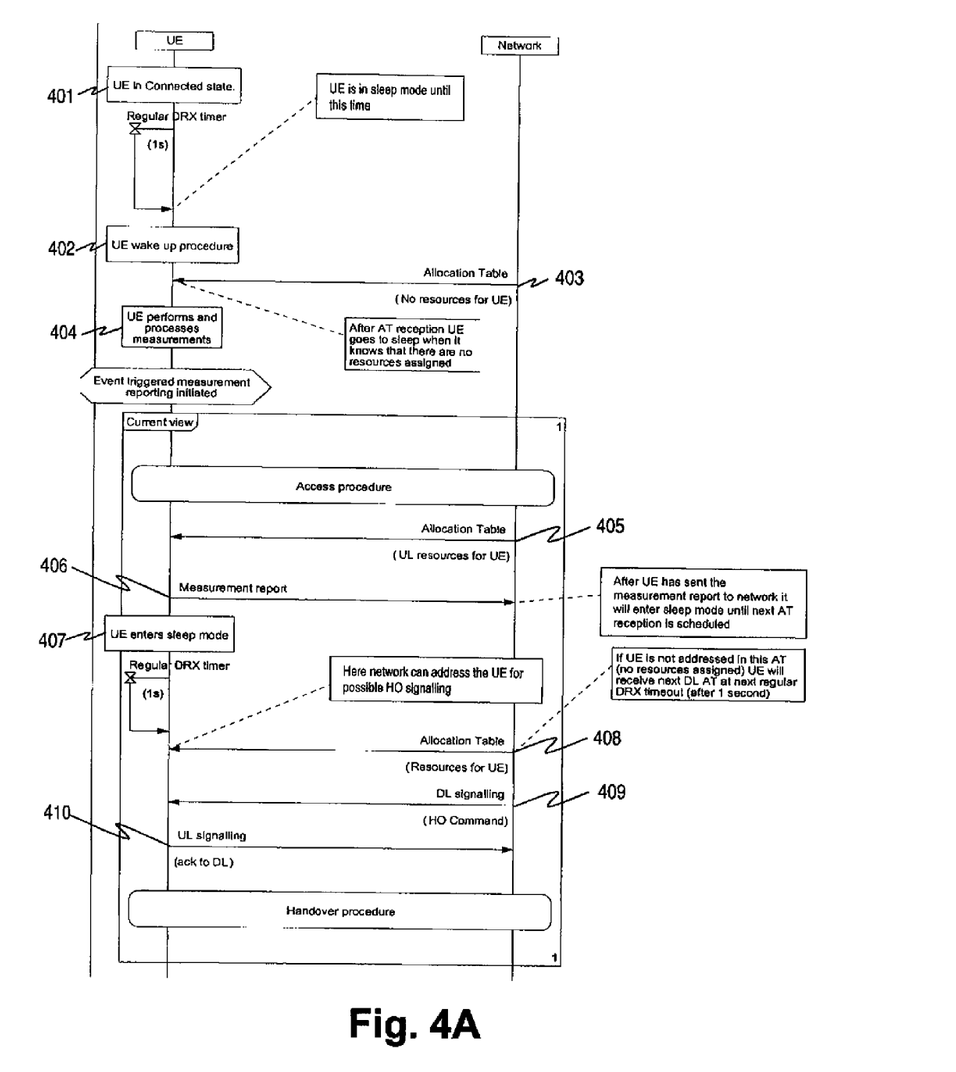
FIGS. 4A to 4C show respective signaling and processing diagrams of a known handover control procedure involving DRX and two cases of a reply-controlled DRX concept according to one embodiment of the invention.
Figure 4B:
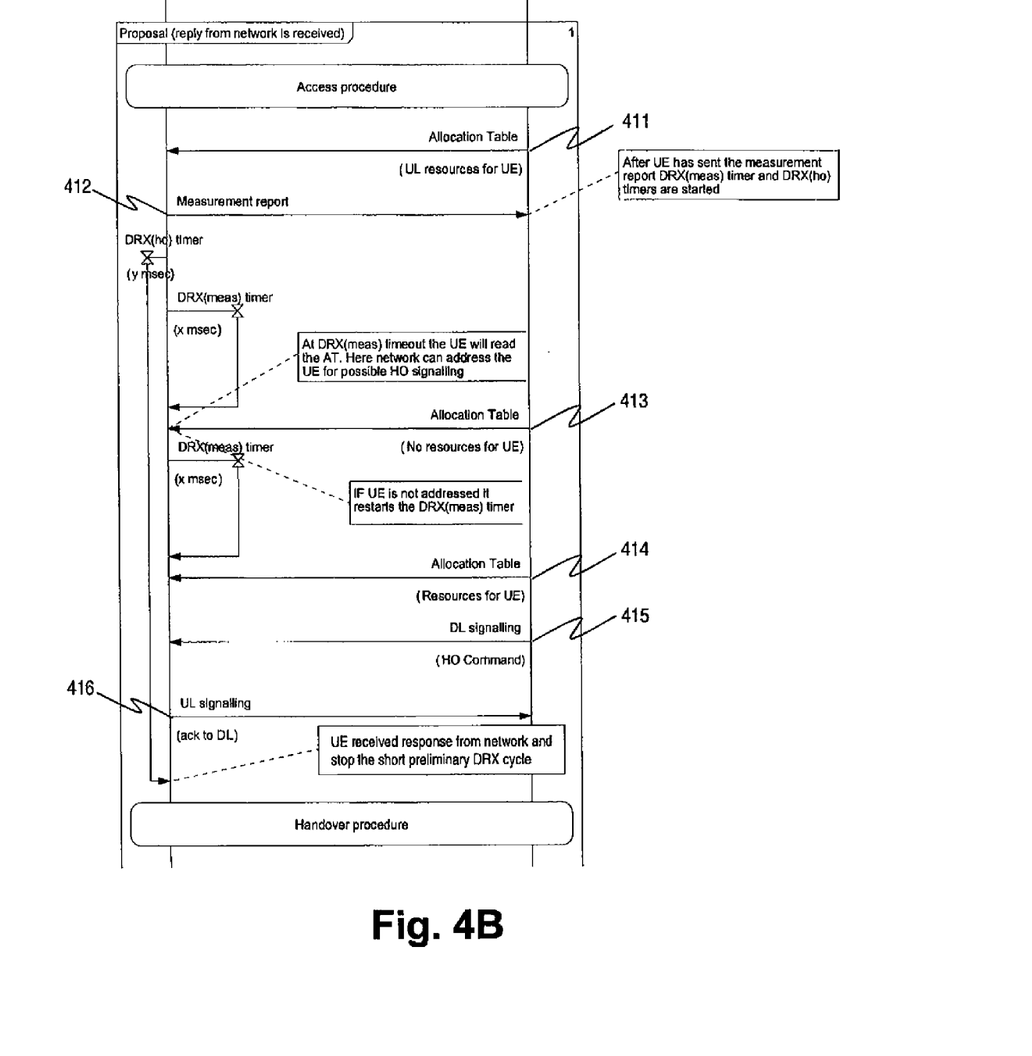
Figure 4C:
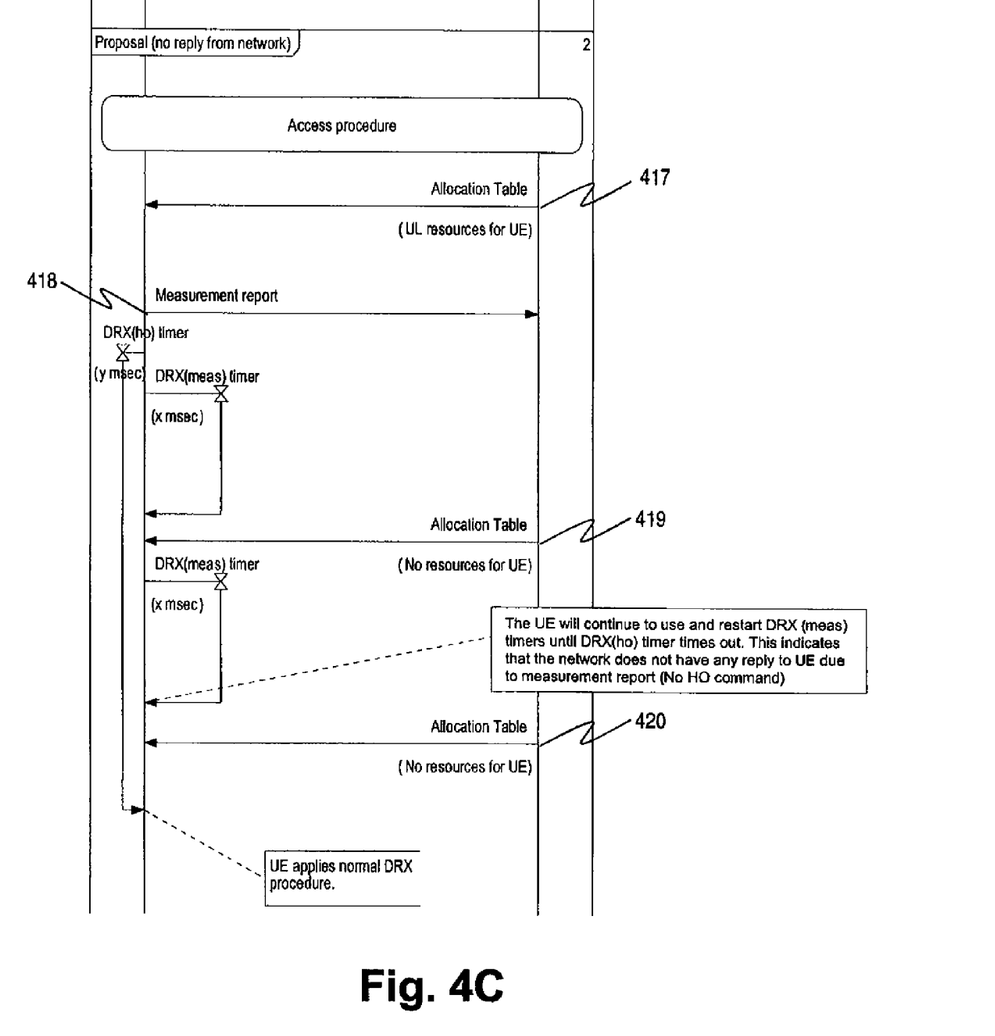

FIGS. 4A to 4C show respective signaling and processing diagrams of a conventional DRX-based HO procedure and two cases of a more detailed implementation example of the reply-controlled DRX concept in an E-UTRAN environment, according to an exemplary embodiment. In the diagram, processing steps at and signaling flows between the UE 10 and the network, i.e., node B 20, are shown, while the time proceeds from the top to the bottom.

At the beginning of the conventional procedure, as indicated in FIG. 4A, it is assumed that the UE 10 is in sleep mode of a connected state and some regular DRX cycle has been assigned (step 401). After time-out of the regular DRX cycle, the UE 10 initiates a wake-up procedure (step 402) and receives an AT from the network, per step 403, e.g., via the node B 20, which however does not address the UE 10. Consequently, the UE 10 knows that there are no resources assigned and enters the sleep mode again. Then, the UE 10 performs and processes measurements, as in step 404. When an event-triggered measurement reporting is initiated, an access procedure starts between the UE 10 and the network, and an AT with resource assignment to the UE 10 is signaled (step 405). In response thereto, the UE 10 sends a measurement report, per step 406, and thereafter enters the sleep mode (step 407) until the next AT reception is scheduled, i.e., when the regular DRX cycle (e.g., 1 s) has timed out. Now, the network can address the UE 10 for a possible HO signaling. If the UE 10 is not addressed in this AT, the UE will receive the next DL AT at the next regular DRX time-out (e.g., after an additional delay of 1 s), as in steps 408 and 409. Having received a HO command from the network, the UE responds with an UL acknowledgement and the HO procedure can finally start, as in step 410.

FIG. 4B shows an improved procedure according to an exemplary embodiment for the case that a reply is received from the network. After the access procedure, an AT which addresses the UE 10 and which includes UL resources for the UE 10 is sent by the network (step 411). In response thereto, the UE 10 sends, per step 412, a measurement report and the DRX control unit 12 is triggered by the signaling control unit 16 to set the first and second control values "DRX(meas)" and "DRX(ho)" at the DRX timer circuit 14, e.g., start a DRX (meas) timer and a DRX(ho) timer.

After the shortened DRX cycle (e.g., x ms) has been timed-out, the UE 10 receives the next DL AT (step 413), and the network can already address the UE 10 for a possible HO signaling. The UE 10 receives the next AT and restarts the DRX timer circuit 14 with the temporary shortened DRX cycle, as it is not addressed. When an AT which addresses the UE 10 and includes resources for the UE 10 is sent by the network (step 414), it may be followed by a DL signaling, per step 415, with a HO command. In response thereto, the UE 10 sends a UL signaling with an acknowledgement to the network (step 416). As the UE 10 has a received a response from the network, the shortened temporary DRX cycles are stopped and the HO procedure is initiated.

FIG. 4C shows an improved procedure according to an exemplary embodiment for the case that no reply is received from the network. After the access procedure, an AT which addresses the UE 10 (step 417) and which includes UL resources for the UE 10 is sent by the network. In response thereto, the UE 10 sends a measurement report, as in step 418, and the DRX control unit 12 is triggered by the signaling control unit 16 to set the first and second control values "DRX(meas)" and "DRX(ho)" at the DRX timer circuit 14, e.g., start a DRX(meas) timer and a DRX(ho) timer.

After the shortened DRX cycle (e.g., x ms) has been timed-out, the UE 10 can receive the next DL AT (step 419), and the network can already address the UE 10 for a possible HO signaling. The UE 10 receives the next AT (step 420) and restarts the DRX timer circuit 14 with the temporary shortened DRX cycle, as it is not addressed. When no AT which addresses the UE 10 and includes resources for the UE 10 is sent by the network, the UE 10 will continue to use and restart the shortened temporary DRX cycle until the lifetime "DRX (ho)" has been timed out by DRX timer circuit 14. This indicates that the network does not have any reply to the UE 10 as a response to the measurement report, and the UE 10 reverts to the normal or regular DRX procedure.

In summary, a method, receiving device, network element, system and computer program product for controlling discontinuous reception at a receiving device of a communication network have been described, wherein a regular discontinuous reception cycle of a discontinuous reception scheme is set, and this regular discontinuous reception cycle is switched to a shorter temporary discontinuous reception cycle or is switched off, in response to an event which triggers a reply of the communication network to the receiving device. Thereby, delays of network replies can be shortened or controlled in case DRX cycles are implemented at the receiving device.

Although the above embodiments have been described in connection with an E-UTRAN environment, the invention can be applied to any connection between a receiving device and a network element of any type of communication or data network which provides a DRX or DRX-like procedure. In particular, the invention is not restricted to the active state DRX, measurement report sending and HO command. These specific cases were only intended as a use cases for describing the basic problem and solution. However, it is apparent to a skilled person that the problem and solution can in fact be generalized to cover any kind of event at a receiving device to which the receiving device would expect a reply from the network within a limited time period. For example, in the exemplary field of wireless communication, any UE initiated UL RRC (Radio Resource Control), MAC (Medium Access Control) or other signaling could be used as an event which triggers switching to the temporary shortened DRX cycle. The various embodiments may thus vary within the scope of the attached claims.

The invention claimed is:

1. A method for a wireless device in communication with a communication network comprising:
   setting a regular discontinuous reception cycle of a discontinuous reception scheme within a wireless device, wherein a regular discontinuous reception cycle comprises a regular duration during which the wireless device enters a sleep mode;
   at an end of the regular discontinuous reception cycle, receiving an allocation table from the communication network at the wireless device upon exiting a reception standby mode;

performing measurements for network resources in response to receiving the allocation table;

transmitting a report, based on the performed measurements, from the device to the communication network; and in response to the transmitting of the report, switching from said regular discontinuous reception cycle to a temporary discontinuous reception cycle comprising a shorter duration than the regular duration;

repeating the temporary discontinuous reception cycle and switching back to the regular discontinuous reception mode after a predetermined number of cycles or receiving a resource response from the communication network.

2. The method according to claim 1, wherein said device is a mobile terminal, the report is a mobility measurement report, and said switching step is performed when said mobile terminal has sent the mobility measurement report to said communication network.

3. The method according to claim 2, wherein said expected reply is a handover command.

4. The method according to claim 1, further comprising switching back to said regular discontinuous reception cycle when no reply has been received from said communication network within a predetermined time period after said switching.

5. The method according to claim 1, further comprising maintaining the temporary or switched-off discontinuous reception until a new discontinuous reception configuration is signaled by said communication network.

6. The method according to claim 1, further comprising switching back to said regular discontinuous reception cycle in response to the receipt of the reply from said communication network.

7. The method according to claim 1, further comprising indicating said report to said device by a system or control information.

8. The method according to claim 1, wherein said switching comprises setting an interval of a cycle timer to a first predetermined value and setting a lifetime of said cycle timer to a second predetermined value.

9. The method according to claim 8, further comprising controlling said first and second values by said network.

10. The method according to claim 9, wherein the report is a measurement report, and said controlling is performed based on the measurement report sent from said device to said network.

11. A wireless device in communication with a communication network comprising:

a timer configured for setting a regular discontinuous reception cycle of a discontinuous reception scheme within the wireless device, wherein the regular discontinuous reception cycle comprises a regular duration during which the wireless device enters a sleep mode;

a wireless transceiver configured for, at an end of the regular discontinuous reception cycle, receiving an allocation table from the communication network at the wireless device upon exiting a reception standby mode, performing measurements for network resources in response to receiving the allocation table and transmitting a report, based on the performed measurements, from the device to the communication network; and a switch comprising circuitry configured for, in response to the transmitting of the report, switching from said regular discontinuous reception cycle to a temporary discontinuous reception cycle comprising a shorter duration than the regular duration, repeating the temporary discontinuous reception cycle and switching back to the regular discontinuous reception mode after a predetermined number of cycles or receiving a resource response from the communication network.

12. The device according to claim 11, wherein said report is a mobility measurement report, and said switch is configured to perform said switching in response to a transmission of the mobility measurement report by said device to said communication network.

13. The device according to claim 11, wherein said reply is a handover command.

14. The device according to claim 11, wherein said switch is configured to switch back to said regular discontinuous reception cycle when no reply has been received from said communication network within a predetermined time period after said switching.

15. The device according to claim 11, wherein said switch is configured to maintain the temporary or switched-off discontinuous reception until a new discontinuous reception configuration is signaled by said communication network.

16. The device according to claim 11, wherein said switch is configured to switch back to said regular discontinuous reception cycle in response to the receipt of a reply from said communication network.

17. The device according to claim 11, wherein said report is derived by said device from a system or control information.

18. The device according to claim 11, wherein said switch is configured to set an interval of a cycle timer to a first predetermined value and to set a lifetime of said cycle timer to a second predetermined value.

19. The device according to claim 11, wherein the device is with a mobile terminal.

20. The device according to claim 11, wherein the switch is further configured to switch said timer from said regular discontinuous reception cycle to a shorter temporary discontinuous reception cycle or for switching off said timer, in response to an event which triggers a reply by a communication network to said device.

21. A tangible computer-readable storage medium storing code which, when executed by one or more processors, cause an apparatus to at least perform a method for a wireless device in communication with a communication network comprising:

setting a regular discontinuous reception cycle of a discontinuous reception scheme within a wireless device, wherein a regular discontinuous reception cycle comprises a regular duration during which the wireless device enters a sleep mode;

at an end of the regular discontinuous reception cycle, receiving an allocation table from the communication network at the wireless device upon exiting the reception standby mode;

performing measurements for the network resources in response to receiving the allocation table;

transmitting a report, based on the performed measurements, from the device to the communication network;

in response to the transmitting of the report, switching from said regular discontinuous reception cycle to a temporary discontinuous reception cycle comprising a shorter duration than the regular duration;

and repeating the temporary discontinuous reception cycle and switching back to the regular discontinuous reception mode after a predetermined number of cycles or receiving a resource response from the network.

* * * * *